US012577131B2

(12) United States Patent
Kobayashi et al.

(10) Patent No.: US 12,577,131 B2
(45) Date of Patent: Mar. 17, 2026

(54) TRANSMEMBRANE PRESSURE DIFFERENCE INFERENCE DEVICE AND DIFFUSED AIR AMOUNT CONTROL DEVICE

(71) Applicant: Kubota Corporation, Osaka (JP)

(72) Inventors: Hiroyuki Kobayashi, Hyogo (JP); Nobukazu Suzuki, Hyogo (JP)

(73) Assignee: Kubota Corporation, Osaka (JP)

( * ) Notice: Subject to any disclaimer, the term of this patent is extended or adjusted under 35 U.S.C. 154(b) by 370 days.

(21) Appl. No.: 18/257,084

(22) PCT Filed: Dec. 9, 2021

(86) PCT No.: PCT/JP2021/045271
§ 371 (c)(1),
(2) Date: Jun. 12, 2023

(87) PCT Pub. No.: WO2022/138189
PCT Pub. Date: Jun. 30, 2022

(65) Prior Publication Data
US 2024/0018021 A1 Jan. 18, 2024

(30) Foreign Application Priority Data
Dec. 24, 2020 (JP) .................................. 2020-215696

(51) Int. Cl.
*C02F 1/44* (2023.01)
(52) U.S. Cl.
CPC ............ *C02F 1/44* (2013.01); *C02F 2209/03* (2013.01); *C02F 2209/44* (2013.01)
(58) Field of Classification Search
CPC ....... B01D 61/22; B01D 2311/14; C02F 1/44; C02F 2209/03; C02F 2209/44
See application file for complete search history.

(56) References Cited

U.S. PATENT DOCUMENTS

2015/0021266 A1 1/2015 Yoshida et al.
2015/0306544 A1* 10/2015 Park ........................ C02F 1/001
210/636
(Continued)

FOREIGN PATENT DOCUMENTS

CN 110668562 A 1/2020
CN 110705049 A 1/2020
(Continued)

OTHER PUBLICATIONS

JP2000300968A—EPO Machine Translation (Year: 2025).*
(Continued)

*Primary Examiner* — Patrick Orme
(74) *Attorney, Agent, or Firm* — McCarter & English, LLP

(57) ABSTRACT

To appropriately infer changes over time in transmembrane pressure to perform an appropriate membrane filtration operation, without being bound by typical approach regarding the diffused air volume control. An inference device (2) includes: an input data acquisition section (21) configured to acquire input data derived from operation data that is measured during a membrane filtration operation, the operation data including a membrane filtration pressure and a diffused air volume; and an inference section (23) configured to (i) use a regression model (31) to infer transmembrane pressure-related data after the predetermined time, and (ii) execute an updating process M times (where M is an integer of not less than 2) while changing part of data included in the input data, the updating process being a process of updating the input data N times (where N is an integer of not less than 2) by changing the transmembrane pressure-related data included in the input data to the inferred transmembrane pressure-related data, so as to obtain M inference results on changes over time in the (Continued)

transmembrane pressure in a period up to N×the predetermined time.

9 Claims, 7 Drawing Sheets

(56) References Cited

U.S. PATENT DOCUMENTS

| 2020/0001240 A1 | 1/2020 | Hayashi et al. |
| 2020/0071209 A1 | 3/2020 | Han et al. |
| 2020/0401943 A1 | 12/2020 | Kawachi et al. |

FOREIGN PATENT DOCUMENTS

| EP | 4160324 | A1 | | 4/2023 |
| JP | 6342101 | A | | 2/1988 |
| JP | 10-286567 | A | | 10/1998 |
| JP | 2000300968 | A | * | 10/2000 |
| JP | 2006-21066 | A | | 1/2006 |
| JP | 2013-202471 | A | | 10/2013 |
| JP | 2019-139554 | A | | 8/2019 |
| JP | 2020-199472 | A | | 12/2020 |

OTHER PUBLICATIONS

European Office Action for Application No. 21910338.9, dated Oct. 14, 2024, 12 pages.

International Search Report and Written Opinion for International Application No. PCT/JP2021/045271, dated Feb. 8, 2022, 13 pages.

Chinese Office Action for Application No. 2021800861843.6, dated May 16, 2025, 16 pages with English translation.

* cited by examiner

FIG. 2

| OPERATION DATA | INPUT DATA |
|---|---|
| MEMBRANE FILTRATION PRESSURE | DISPERSION OF MEMBRANE FILTRATION PRESSURE, TRANSMEMBRANE PRESSURE, FLUCTUATION SPEED OF TRANSMEMBRANE PRESSURE (MOST RECENT 1, 3, 24 HOURS) |
| DIFFUSED AIR VOLUME | DIFFUSED AIR VOLUME, INTEGRATED VALUE (MOST RECENT 1, 3, 24 HOURS) |
| WATER TEMPERATURE | AVERAGE VALUE |
| ELAPSED TIME | ELAPSED TIME |

TRANSMEMBRANE PRESSURE DIFFERENCE INFERENCE DEVICE AND DIFFUSED AIR AMOUNT CONTROL DEVICE

CROSS-REFERENCE TO RELATED APPLICATIONS

This application is a 35 U.S.C. § 371 national stage filing of International Application No. PCT/JP2021/045271 filed on Dec. 9, 2021, which in turn claims priority to Japanese Patent Application No. 2020-215696, filed Dec. 24, 2020. The entire contents of each of the foregoing applications are included herein by reference in their entirety.

TECHNICAL FIELD

The present invention relates to a transmembrane pressure inference device and the like which are applied in a membrane filtration process in which, while air is diffused through a membrane surface of the separation membrane disposed to be immersed in a water to be treated, a treated water that has passed through the separation membrane is obtained.

BACKGROUND ART

Patent Literature 1 discloses the technique in which, at a control time at which a diffused air volume supplied to a separation membrane for use in a membrane filtration process is controlled, a comparison with a target increase speed selected on the basis of a preset threshold value and an organic substance concentration is made based on the amount of change in transmembrane pressure, a rate of the change in transmembrane pressure, or a transmembrane pressure increase speed from a certain time point in the past, so that the diffused air volume is determined. Specifically, Patent Literature 1 discloses the technique in which when a calculated increase speed of the transmembrane pressure is greater than a target increase speed, the diffused air volume is increased to reduce the increase speed of the transmembrane pressure.

CITATION LIST

Patent Literature

[Patent Literature 1]
Japanese Patent No. 6342101

SUMMARY OF INVENTION

Technical Problem

In a diffused air volume control in a membrane filtration operation, a typical approach is as follows: "when the condition of the separation membrane is worse, the diffused air volume is made to be increased to reduce the increase speed of the transmembrane pressure". However, the Applicant of the present application has found that decreasing the diffused air volume may reduce the increase speed of the transmembrane pressure depending on the circumstances of the membrane filtration operation, and increasing the diffused air volume may cause an increase in transmembrane pressure and cause fouling. That is, the Applicant has found that such a typical approach regarding the relationship between the diffused air volume and the transmembrane pressure is not always correct.

An object of an aspect of the present invention is to provide a transmembrane pressure inference device and the like that appropriately infers changes over time in transmembrane pressure to perform an appropriate membrane filtration operation, without being bound by the typical approach to the diffused air volume control.

Solution to Problem

To achieve the object, a transmembrane pressure inference device in accordance with an aspect of the present invention includes: an input data acquisition section configured to acquire input data derived from operation data that is measured during a membrane filtration operation which is carried out by a membrane separation device, the operation data including a membrane filtration pressure and a diffused air volume, the membrane separation device comprising: a separation membrane disposed so as to be immersed in a water to be treated; and an air diffusion device configured to perform air diffusion through a membrane surface of the separation membrane, the membrane separation device being configured to obtain a treated water that has passed through the separation membrane while causing the air diffusion device to perform the air diffusion; and an inference section configured to (i) use a regression model that uses, as an explanatory variable, the input data and uses, as an objective variable, transmembrane pressure-related data related to a transmembrane pressure of the separation membrane after a predetermined time associated with the input data, to infer the transmembrane pressure-related data after the predetermined time, and (ii) execute an updating process M times (where M is an integer of not less than 2) while changing part of data included in the input data, the updating process being a process of updating the input data N times (where N is an integer of not less than 2) by changing the transmembrane pressure-related data included in the input data to the inferred transmembrane pressure-related data, so as to execute an inference process of obtaining M inference results on changes over time in the transmembrane pressure in a period up to N×the predetermined time.

Further, a diffused air volume control device in accordance with an aspect of the present invention may be such that the input data includes diffused air volume-related data related to the diffused air volume of the air diffusion device, the diffused air volume control device including a diffused air volume acquisition section configured to acquire the diffused air volume-related data included in the input data used in inference of an inference result determined by the transmembrane pressure inference device, the diffused air volume control device being configured to control the air diffusion device so that the air diffusion device performs air diffusion on the basis of the acquired diffused air volume-related data.

The transmembrane pressure inference device and the diffused air volume control device in accordance with each aspect of the present invention may be realized by a computer. In this case, the present invention encompasses (i) a control program for the transmembrane pressure inference device and the diffused air volume control device for causing the computer to implement the transmembrane pressure inference device and the diffused air volume control device by causing the computer to operate as each section (software element) provided in the transmembrane pressure inference device and the diffused air volume control device and (ii) a computer-readable storage medium in which the control program is stored.

Advantageous Effects of Invention

According to an aspect of the present invention, it is possible to appropriately infer changes over time in trans-membrane pressure to perform an appropriate membrane filtration operation, without being bound by the typical approach to the diffused air volume control.

BRIEF DESCRIPTION OF DRAWINGS

FIG. 2 is a diagram illustrating a specific example of input data derived from operation data.

FIG. 5 is a block diagram illustrating an example of the configurations of main parts of a regression model generation device, the inference device, and a diffused air volume control device, illustrated in FIG. 1.

DESCRIPTION OF EMBODIMENTS

<Overview of Transmembrane Pressure Inference System For Separation Membrane>

Figure 1:
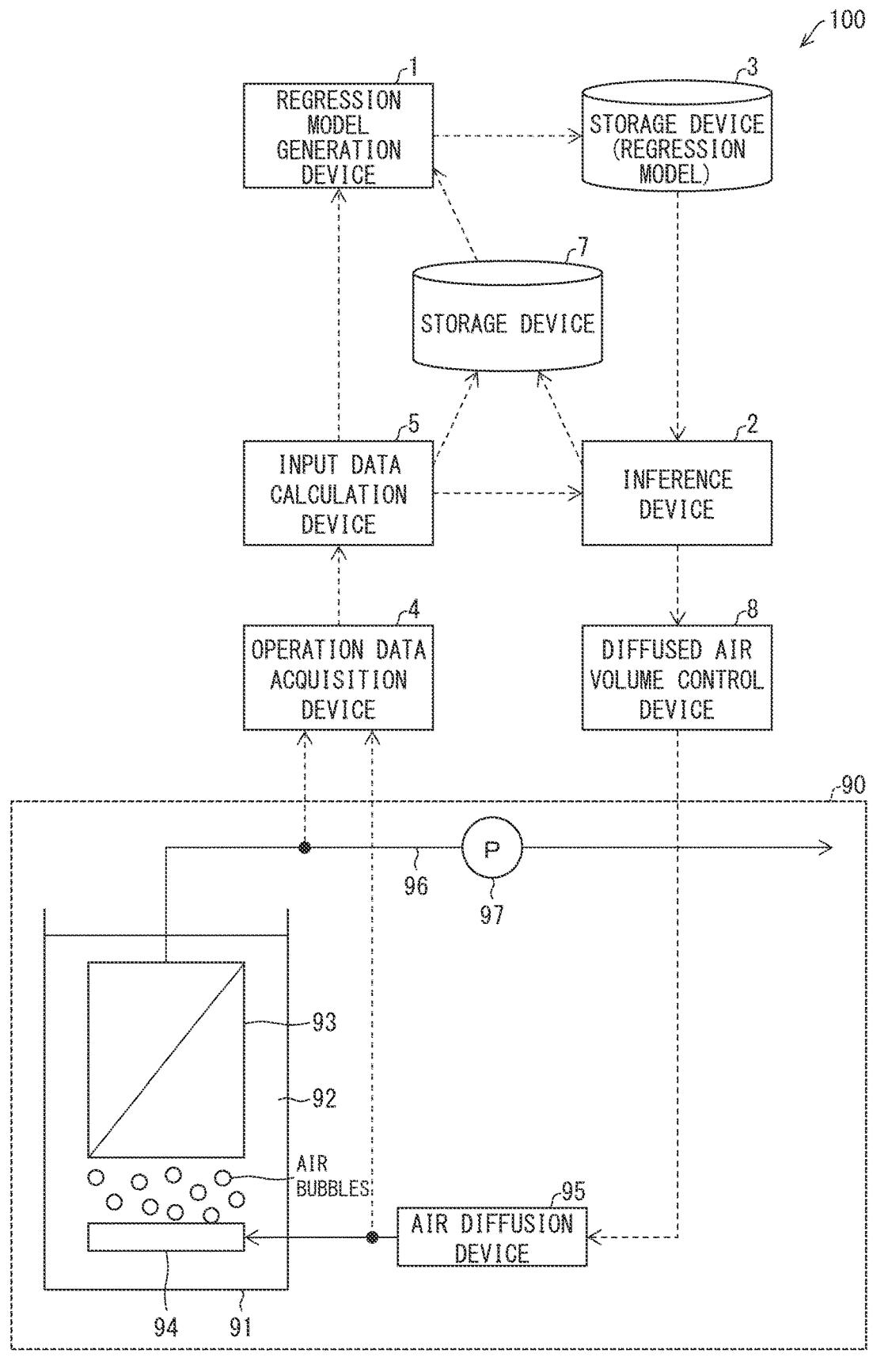
FIG. 1 is a diagram illustrating an overview of a trans-membrane pressure inference system in accordance with an embodiment of the present invention.

FIG. 1 is a diagram illustrating an overview of a trans-membrane pressure inference system 100 for a separation membrane in accordance with Embodiment 1. The trans-membrane pressure inference system 100 is a system that uses a regression model generated by means of machine learning to infer the changes over time in transmembrane pressure of a separation membrane 93 used for a membrane filtration operation and controls the volume of diffused air to be supplied to the separation membrane 93 in accordance with the result of the inference. Details of the transmem-brane pressure will be described later.

The transmembrane pressure inference system 100 includes a regression model generation device 1, an inference device 2 (transmembrane pressure inference device), a storage device 3, an operation data acquisition device 4, an input data calculation device 5, a diffused air volume control device 8, and a membrane separation device 90, and may further include a storage device 7.

Note that the regression model generation device 1, the inference device 2, the storage device 3, the operation data acquisition device 4, the input data calculation device 5, and the storage device 7 may be provided by any methods and in any locations. However, a preferable typical example is such that the operation data acquisition device 4 and the diffused air volume control device 8 are provided as programmable logic controllers (PLCs), the inference device 2, the input data calculation device 5, and the storage device 7 are provided in the form of edge computing, and the regression model generation device 1 and the storage device 3 are provided in the form of cloud computing.

(Membrane Separation Device 90)

The membrane separation device 90 is a device that carries out a membrane filtration operation in which a water to be treated is subjected to filtration with use of a separation membrane to obtain a treated water that has passed through the separation membrane. The treated water can also be expressed as water to be treated from which impurities have been removed by filtration.

The membrane separation device 90 includes a membrane separation tank 91, a separation membrane 93, an air diffu-sion tube 94, an air diffusion device 95, filtered water piping 96, and a filtration pump 97. The membrane separation tank 91 stores a water 92 to be treated. The separation membrane 93 is disposed so as to be immersed in the water 92 to be treated to filter the water 92 to be treated. The filtered water piping 96 is connected to the membrane separation tank 91 via the separation membrane 93 and distributes the treated water obtained by filtration of the water 92 to be treated with use of the separation membrane 93. The filtration pump 97 is connected to the separation membrane 93 via the filtered water piping 96 and allows the treated water to flow out. The air diffusion device 95 supplies air for removing the impu-rities adhering to the separation membrane 93. In other words, the air diffusion device 95 performs air diffusion through a membrane surface of the separation membrane 93. The air diffusion tube 94 is disposed immediately below the separation membrane 93 and uses the air supplied from the air diffusion device 95 to supply air bubbles flown upwards from below the separation membrane 93.

The membrane separation tank 91 only needs to be able to receive and store the water 92 to be treated flowing into the membrane separation tank 91, and only needs to be made of a material that does not leak water, such as concrete, stainless steel, or resin. Further, the structure of the mem-brane separation tank 91 only needs to be a structure that does not leak water.

The separation membrane 93 only needs to be a mem-brane capable of separating a solid and a liquid, such as a hollow fiber membrane or a flat membrane. Examples of the separation membrane 93 include, but not limited to, a reverse osmosis (RO) membrane, a nanofiltration (NF) membrane, an ultrafiltration (UF) membrane, a microfiltra-tion (MF) membrane, and the like.

The air diffusion tube 94 only needs to be capable of supplying air bubbles, and, as a material of which the air diffusion tube 94 is made, for example, glass, stainless steel, sintered metal, or resin can be used. The air diffusion device only needs to be a device capable of pumping air, such as a blower.

(Operation Data Acquisition Device 4)

The operation data acquisition device 4 uses various sensors and the like to acquire operation data measured during the membrane filtration operation, and transmits the acquired operation data to the input data calculation device 5. The operation data in accordance with Embodiment 1 includes at least a membrane filtration pressure, a diffused air volume, a water temperature, and an elapsed time. The membrane filtration pressure is acquired from, for example, a pressure gauge disposed in the filtered water piping 96 between the separation membrane 93 and the filtration pump 97. The diffused air volume is the volume of air supplied by the air diffusion device 95 and is acquired directly from the air diffusion device 95. The water temperature is the temperature of the water 92 to be treated, and is acquired from a thermometer disposed inside the water 92 to be treated stored in the membrane separation tank 91. The elapsed time is an elapsed time from a time point when the separation membrane 93 is subjected to chemical washing, and is acquired from a timer. The timer resets the elapsed time every time the chemical washing is performed, and a position where the timer is disposed is not particularly limited. The timer may be provided in the operation data acquisition device 4 as an application. Further, the timer may be connected to the input data calculation device 5 so that they can communicate with each other, or alternatively may be provided in the input data calculation device 5 as an application. In the case of this example, the input data calculation device 5 acquires the elapsed time without the intervention of the operation data acquisition device 4. Here, the above-mentioned reset may be manually carried out by a user of the transmembrane pressure inference system 100.

The chemical washing refers to washing of the separation membrane 93 that has been contaminated in the membrane filtration process, with use of a chemical agent.

Further, the operation data is not limited to this example. For example, the operation data may include a membrane filtration flow rate. The membrane filtration flow rate is acquired from, for example, a flowmeter disposed on the filtered water piping 96.

(Input Data Calculation Device 5)

The input data calculation device 5 derives, from received operation data, input data to be inputted to the regression model generation device 1 and the inference device 2. The input data is data representing a feature amount of the operation data, and can be operation data itself or can be acquired by performing computation on the operation data. Then, in a phase of generating a regression model, the input data calculation device 5 directly transmits the calculated input data to the regression model generation device 1 or transmits the calculated input data to the storage device 7 for storing the input data. In a phase of inferring the transmembrane pressure, the input data calculation device 5 transmits the calculated input data to the inference device 2. Details of the input data will be described later.

(Regression Model Generation Device 1)

The regression model generation device 1 generates a regression model for inferring the transmembrane pressure by means of machine learning using the received input data as an input, and stores the generated regression model in the storage device 3. Details of the regression model will be described later.

(Inference Device 2)

The inference device 2 makes access to the regression model stored in the storage device 3 and uses the regression model to infer the changes over time in transmembrane pressure from the input data having been received from the input data calculation device 5. Details of the inference of the changes over time will be described later.

(Diffused Air Volume Control Device 8)

The diffused air volume control device 8 determines, in accordance with the inference result from the inference device 2, the level of the volume of air diffused by the air diffusion device 95 (hereinafter referred to simply as "diffused air volume level"), and controls the air diffusion device 95 so that the air diffusion device 95 performs air diffusion at the determined diffused air volume level. Details of the diffused air volume control will be described later.

Specific Examples of Input Data

FIG. 2 is a diagram illustrating a specific example of the input data derived from the operation data. The input data calculation device 5 calculates, from the membrane filtration pressure, which is the operation data, as an example, a dispersion of the membrane filtration pressure. The dispersion of the membrane filtration pressure is a dispersion of the membrane filtration pressure in a certain cycle of the membrane filtration operation (hereinafter referred to as "cycle of interest"). Details of the cycle of the membrane filtration operation will be described later.

The transmembrane pressure (TMP) is a difference between the pressure on the side of the water 92 to be treated and the pressure on the side of the treated water in the separation membrane 93. The fluctuation speed of the transmembrane pressure (which may hereinafter be referred to simply as "fluctuation speed") is calculated as a slope of the transmembrane pressure ($\Delta\text{TMP}/\Delta\text{T}$) in a predetermined period (hereinafter referred to as "P") from a predetermined time point in the cycle of interest. Note that P is selected as appropriate from several hours to several days. As an example, the fluctuation speed may be calculated as a slope of a regression model (linear regression) of changes over time in transmembrane pressure in P. At this time, the fluctuation speed may not take a negative value.

Further, the input data calculation device 5 calculates, from the diffused air volume, which is the operation data, an integrated value of the diffused air volume, as an example. The integrated value of the diffused air volume (hereinafter referred to as "integrated diffused air volume") is an integrated value of the diffused air volume in P, and is calculated, as an example, as an integrated value of the diffused air volume in P.

As illustrated in FIG. 2, the input data may include a plurality of fluctuation speeds and a plurality of integrated diffused air volumes, which are different in P. In the example of FIG. 2, P is most resent 1 hour, most resent 3 hours, and most recent 24 hours.

Further, the input data calculation device 5 calculates, from the water temperature, which is the operation data, an average value of the water temperature, as an example. The average value of the water temperature is an average value of the water temperature in the cycle of interest. The elapsed time is the elapsed time itself included in the operation data.

Note that the input data is not limited to the example shown in FIG. 2. For example, the input data may include, as data calculated from the membrane filtration pressure: the maximum value of the membrane filtration pressure; the minimum value of the membrane filtration pressure; the standard deviation value of the membrane filtration pressure; the average value of the membrane filtration pressure; the transmembrane pressure; the fluctuation speed of the transmembrane pressure; the fluctuation amount of the transmembrane pressure; and the fluctuation rate of the transmembrane pressure.

The maximum value of the membrane filtration pressure is a maximum value of the membrane filtration pressure in the cycle of interest. The minimum value of the membrane filtration pressure is a minimum value of the membrane filtration pressure in the cycle of interest. The standard deviation value of the membrane filtration pressure is a standard deviation value of the membrane filtration pressure in the cycle of interest. The average value of the membrane filtration pressure is an average value of the membrane filtration pressure in the cycle of interest.

For example, the input data may also include the fluctuation amount and the fluctuation rate of the transmembrane pressure. The fluctuation amount of the transmembrane pressure (which may hereinafter be referred to simply as "fluctuation amount") refers to a fluctuation amount in P. As an example, the fluctuation amount is calculated as a difference between a value of TMP at a predetermined time point and a value of TMP at a time point when P has elapsed. The fluctuation rate of the transmembrane pressure (which may hereinafter be referred to simply as "fluctuation rate") refers to a fluctuation rate in P. As an example, the fluctuation rate is calculated by dividing the fluctuation speed by the transmembrane pressure ($\Delta$TMP/(TMP$\times\Delta$T)).

For example, the input data may also include, as data calculated from the diffused air volume, the average value of the diffused air volume. The average value of the diffused air volume is an average value of the diffused air volume in the cycle of interest.

For example, the input data may also include, as data calculated from the membrane filtration flow rate, the average value of the membrane filtration flow rate and the integrated value of the membrane filtration flow rate. The average value of the membrane filtration flow rate is an average value of the membrane filtration flow rate in the cycle of interest. The integrated value of the membrane filtration flow rate is an integrated value of the membrane filtration flow rate in P, and is calculated, as an example, as an integrated value of the average membrane filtration flow rate in P.

Although not illustrated, time information indicative of a time at which the operation data that serves as the derivation source of the input data has been acquired may be assumed to be associated with the input data.

The input data may also include, as data calculated from various kinds of operation data on the basis of P, data other than the fluctuation speed or the integrated diffused air volume. For example, the input data may include the average value of the water temperature in P.

<Overview of Inference Process>

In the inference process of the transmembrane pressure in accordance with Embodiment 1 (hereinafter referred to simply as "inference process"), a simulation that repeats long-term inference based on the regression analysis while changing parameters is performed.

Figure 3:
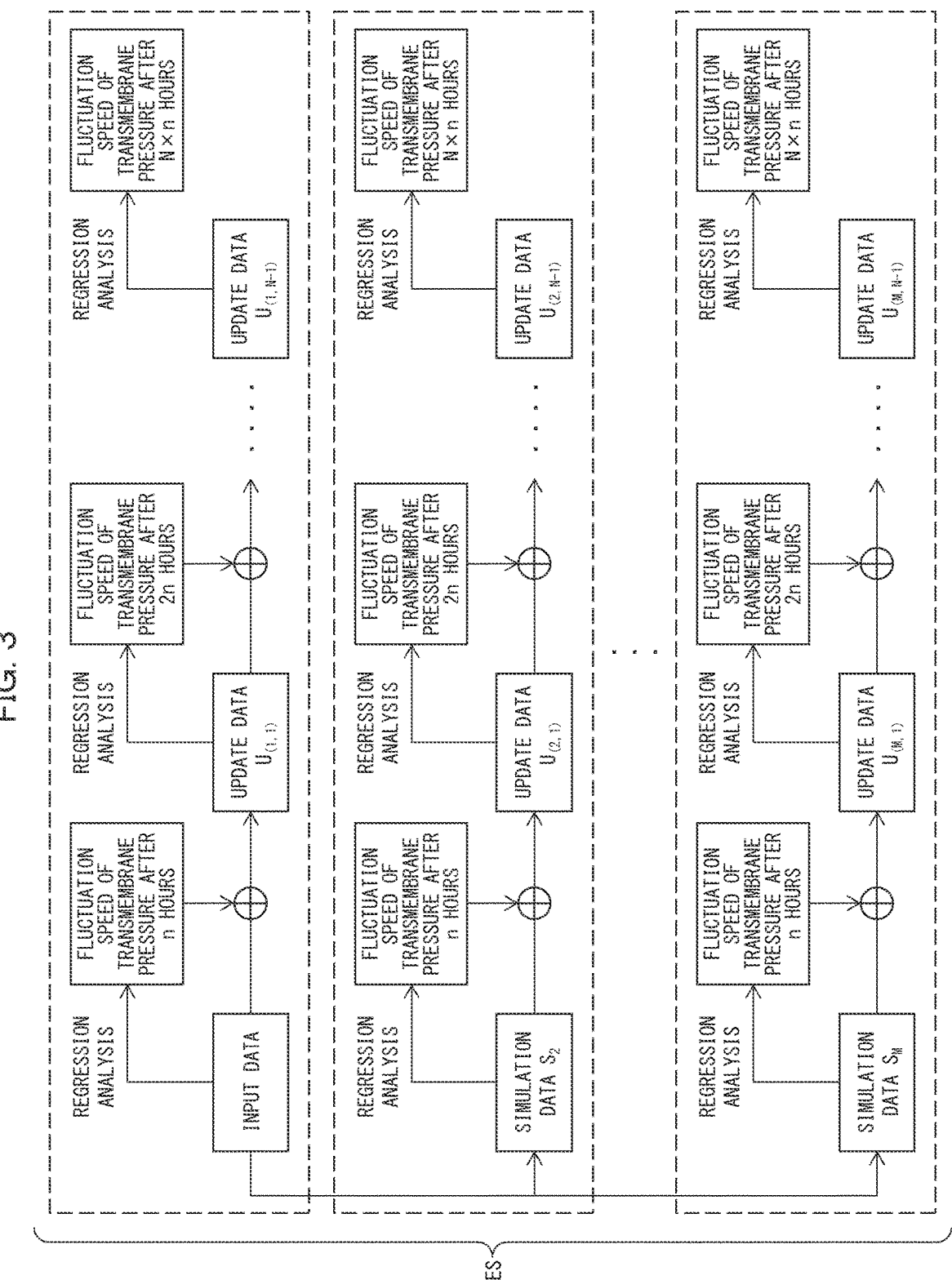
FIG. 3 is a diagram illustrating an overview of an inference process executed by an inference device illustrated in FIG. 1.

[Processing 1] FIG. 3 is a schematic view illustrating the overview of the inference process. First, the long-term inference based on regression analysis will be outlined with reference to FIG. 3.

The regression analysis of Embodiment 1 uses, as an explanatory variable, the input data acquired from the input data calculation device 5 or the storage device 7, and uses, as an objective variable, data related to the transmembrane pressure of the separation membrane 93 after a predetermined n hours (where n is a positive integer) from a time which has been associated with the input data (hereinafter referred to as "transmembrane pressure-related data"). The transmembrane pressure-related data is, as an example, data on at least one selected from the group consisting of the transmembrane pressure itself, the fluctuation speed of the transmembrane pressure, the fluctuation amount of the transmembrane pressure, and the fluctuation rate of the transmembrane pressure, which have been described above. Note that, in Embodiment 1, it is assumed that the transmembrane pressure-related data is the abovementioned fluctuation speed. Based on this regression analysis, a process of inferring the transmembrane pressure after n hours during which a current value of the diffused air volume is maintained is executed. Then, data in which the fluctuation speed in the input data has been updated with use of the inferred fluctuation speed after n hours (hereinafter referred to as "update data") is generated, and regression analysis is performed again on the update data. This process is iterated N times (where N is an integer of not less than 2). In other words, a process of "inferring the fluctuation speed after n hours through regression analysis, and updating the input data by changing the fluctuation speed included in the input data to the transmembrane pressure-related data after n hours" is executed N times.

Specifically, on the first iteration, the fluctuation speed after n hours from the time associated with the input data is inferred through regression analysis using the input data as an explanatory variable, and then, update data $U_{(1,1)}$ is generated in which the fluctuation speed in the input data has been updated with use of the inferred fluctuation speed.

On the Xth iteration (where X is an integer of not less than 2 and less than N), the fluctuation speed after X$\times$n hours from the time associated with the input data is inferred through regression analysis using the update data $U_{(1,X-1)}$ as an explanatory variable, and then, update data $U_{(1,X)}$ is generated in which the fluctuation speed in the update data $U_{(1,X-1)}$ has been updated with use of the inferred fluctuation speed.

On the Nth iteration, the fluctuation speed after N$\times$n hours from the time associated with the input data is inferred through regression analysis using the update data $U_{(1,N-1)}$ as an explanatory variable. Update data $U_{(1,N)}$ may be generated in which the fluctuation speed in the update data $U_{(1,N-1)}$ has been updated with use of the inferred fluctuation speed.

As described above, a total of N transmembrane pressures after n hours, after 2n hours, . . . , and after N$\times$n hours from the time associated with the input data are inferred. As described above, the changes over time in the transmembrane pressure in a period up to N$\times$n hours during which the current value of the diffused air volume is maintained are inferred.

[Processing 2] Next, the above-described processing 1 is performed with use of data in which data related to the diffused air volume (part of the data; hereinafter referred to as "diffused air volume-related data") in the input data has been changed (hereinafter referred to as "simulation data"). The diffused air volume-related data is at least one selected from the group consisting of the diffused air volume, the average value of the diffused air volume, and the integrated value of the diffused air volume, which have been described above. Note that, in Embodiment 1, it is assumed that the diffused air volume-related data is the diffused air volume. This process is executed M times (where M is an integer of not less than 2) while the diffused air volume is changed. That is, the processing 1 is executed on M pieces of data (input data and M−1 pieces of simulation data) which differ from each other. That is, in the processing 2, the above-described processing 1 is executed M times while changing part of the data included in the input data, to thereby acquire M inference results on the changes over time in transmembrane pressure in a period up to N$\times$n hours.

The processing on the first iteration out of M iterations is the above-described processing 1 executed on the input data, and specifics of the processing are as described above.

As the processing on the Yth iteration out of the M iterations (where Y is an integer of not less than 2 and not more than M), the above-described processing 1 is executed on the simulation data $S_Y$ in which the diffused air volume in the input data is changed. Specifically, on the first iteration of the processing 1, the fluctuation speed after n hours from the time associated with the simulation data $S_Y$ is inferred through regression analysis using the simulation data $S_Y$ as an explanatory variable, and then, update data $U_{(Y,1)}$ is generated in which the fluctuation speed in the simulation data $S_Y$ has been updated with use of the inferred fluctuation speed. On the Xth iteration of the processing 1, the fluctuation speed after X×n hours from the time associated with the simulation data $S_Y$ is inferred through regression analysis using the update data $U_{(Y,X-1)}$ as an explanatory variable, and then, update data $U_{(Y,X)}$ is generated in which the fluctuation speed in the update data $U_{(Y,X-1)}$ has been updated with use of the inferred fluctuation speed. On the Nth iteration of the processing 1, the fluctuation speed after N×n hours from the time associated with the simulation data $S_Y$ is inferred through regression analysis using the update data $U_{(Y,N-1)}$ as an explanatory variable.

By executing the above-described processing 1 and processing 2, it is possible to infer, with respect to each of the M diffused air volumes, changes over time in transmembrane pressure in a period up to N×n hours during which the current value of the diffused air volume is maintained.

<Cycle of Membrane Filtration Operation>

Figure 4:
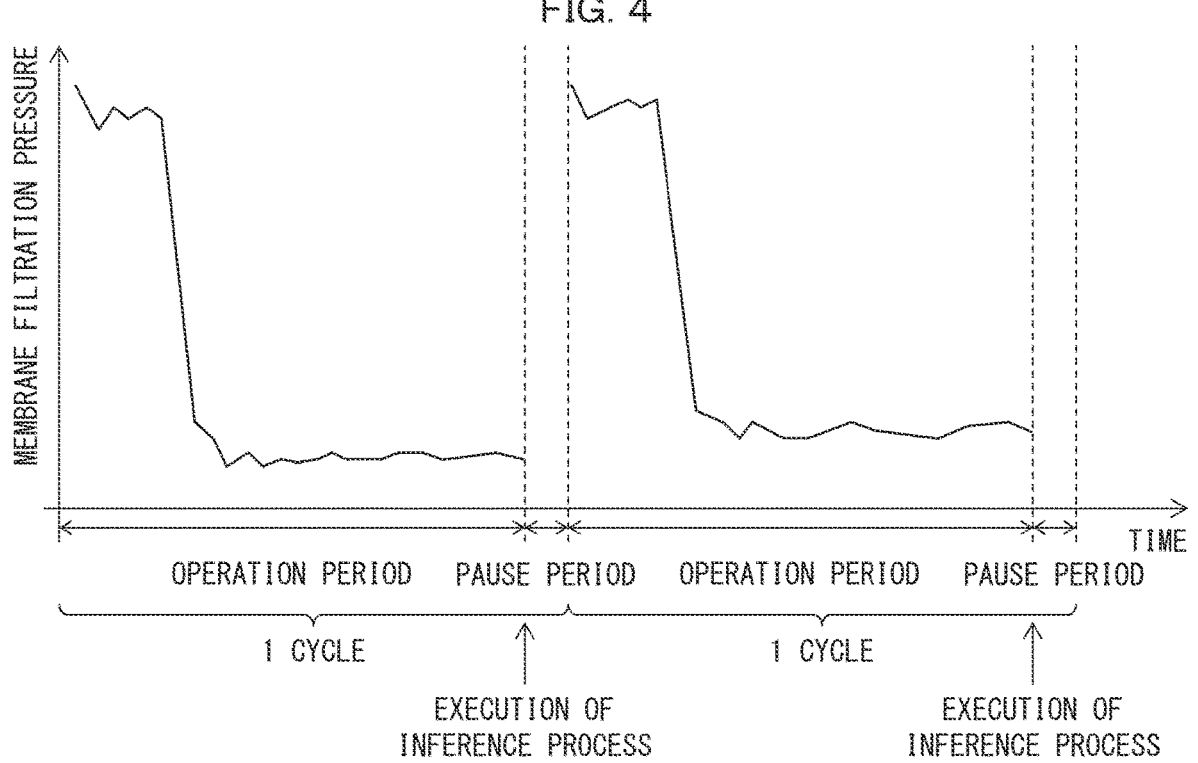
FIG. 4 is a graph showing changes over time in membrane filtration pressure which is measured during the membrane filtration operation carried out by the membrane separation device illustrated in FIG. 1.

FIG. 4 is a graph showing changes over time in membrane filtration pressure which is measured during the membrane filtration operation carried out by the membrane separation device 90. A cycle of the membrane filtration operation will be described with reference to FIG. 4. The cycle of the membrane filtration operation consists of an operation period (for example, about 5 minutes) during which the membrane filtration operation is carried out and a pause period (for example, about 1 minute) that follows the operation period and that is a period during which the membrane filtration operation is not carried out. The membrane filtration operation is an intermittent operation in which this cycle is repeated. As used herein, the cycle of the membrane filtration operation may be referred to as "unit period".

In the transmembrane pressure inference system 100, as an example, it is preferable that the input data calculation device 5 derives, in the pause period, the input data with use of the operation data acquired during the operation period by the operation data acquisition device 4, and it is also preferable that, following this, the inference device 2 infers the changes over time in transmembrane pressure and controls the air diffusion device 95 in accordance with the inference result. The transmembrane pressure inference system 100 executes this series of processes cyclically. Specifically, the inference device 2 acquires the input data from the input data calculation device 5 in a cycle that is L times (L is an integer of not less than 1) as long as the unit period (hereinafter referred to as "unit cycle"), and the inference device 2 executes the above-described inference process every time the input data is acquired. This allows the transmembrane pressure inference system 100 to infer the changes over time in transmembrane pressure for each pause period in the unit cycle, and then appropriately control the volume of air diffused by the air diffusion device Note that a typical value of L is "1". Thus, it is preferable that the inference device 2 acquires the input data from the input data calculation device 5 for each pause period, and executes the above-described inference process.

<Configurations of Main Parts of Devices>

Figure 5:
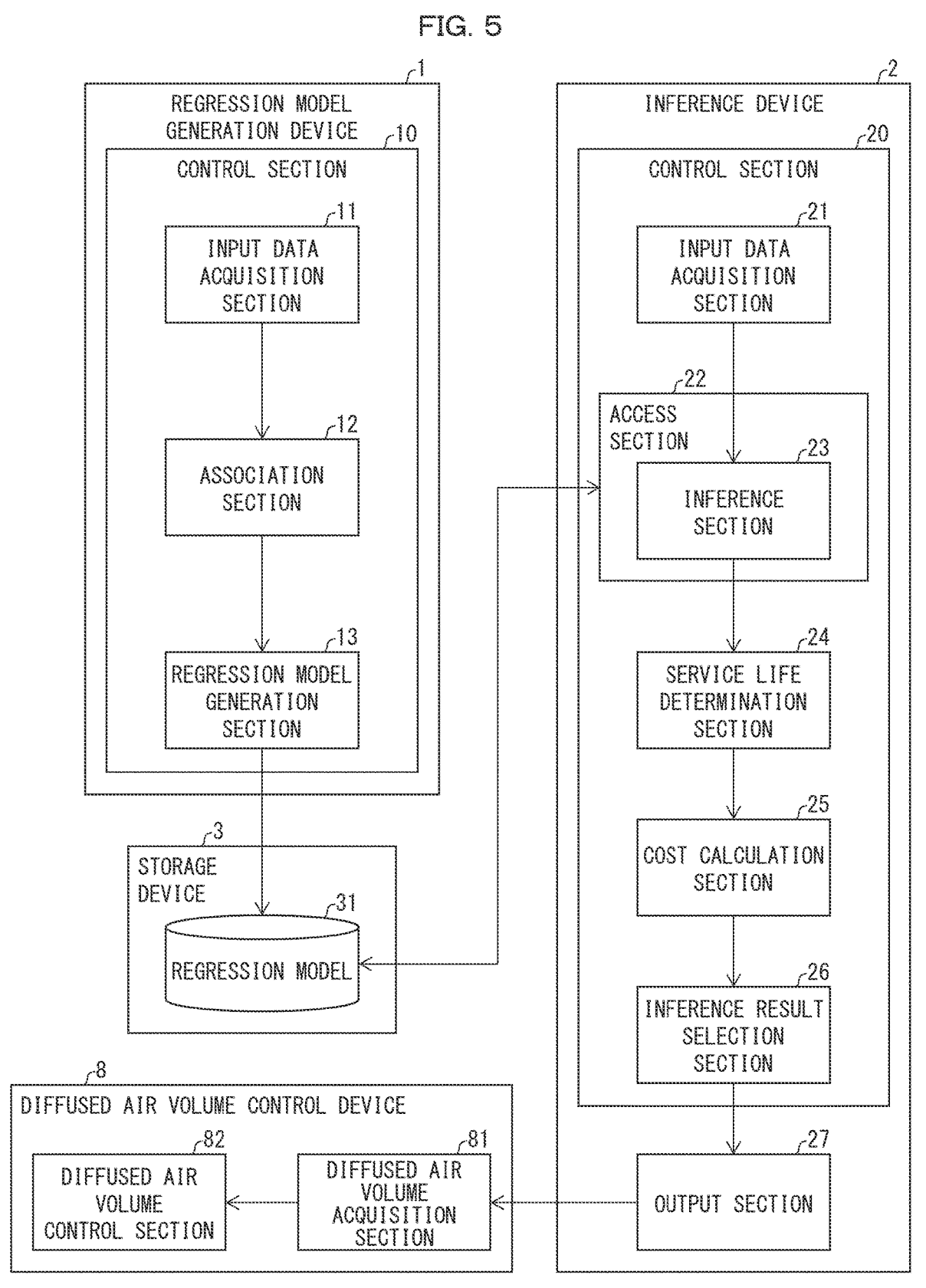

FIG. 5 is a block diagram illustrating an example of configurations of main parts of the regression model generation device 1, the inference device 2, and the diffused air volume control device 8, in accordance with Embodiment 1.

(Regression Model Generation Device 1)

The regression model generation device 1 includes a control section 10. The control section 10 centrally controls individual sections of the regression model generation device 1 and is realized, as an example, by a processor and a memory. In this example, the processor accesses a storage (not illustrated), loads a program (not illustrated) stored in the storage into the memory, and executes a series of instructions included in the program. This constitutes the individual sections of the control section 10.

As the individual sections, the control section 10 includes an input data acquisition section 11, an association section 12, and a regression model generation section 13.

The input data acquisition section 11 acquires input data from the input data calculation device 5 or the storage device 7, and outputs the acquired input data to the association section 12.

The association section 12 associates, with each piece of the input data, the fluctuation speed after n hours from the time associated with the input data. The value of n is, for example, 12 or 24, but is not limited to this example.

The association section 12 outputs, to the regression model generation section 13, the input data with which the fluctuation speed after n hours has been associated. Note that input data with which no fluctuation speed has been associated because any fluctuation speed after n hours has not yet existed may be retained in the association section 12 until the fluctuation speed can be acquired.

The regression model generation section 13 generates a regression model 31 that uses the input data as an explanatory variable and uses the fluctuation speed after n hours as an objective variable, and then stores the regression model 31 in the storage device 3.

(Inference Device 2)

The inference device 2 includes a control section 20 and an output section 27. The control section 20 centrally controls individual sections of the inference device 2 and is realized, as an example, by a processor and a memory. In this example, the processor accesses a storage (not illustrated), loads a program (not illustrated) stored in the storage into the memory, and executes a series of instructions included in the program. This constitutes the individual sections of the control section 20.

The control section 20 includes, as the individual sections, an input data acquisition section 21, an access section 22, a service life determination section 24 (period determination section), a cost calculation section 25, and an inference result selection section 26 (determination section).

The input data acquisition section 21 acquires input data from the input data calculation device 5 every time the unit cycle has elapsed, and outputs the input data to the access section 22. The input data is preferably derived from operation data measured in the most recent membrane filtration operation.

The access section 22 makes access to the regression model 31 stored in the storage device 3. The access section 22 includes an inference section 23.

The inference section 23, with use of the regression model 31 to which the access section 22 has made access, executes the inference process in which the input data acquired from the input data acquisition section 21 is used. Specifically, the inference section 23 first executes the above-described processing 1. Specifically, the inference section 23 inputs, to the regression model 31 to which the access section 22 has made access, the input data acquired by the input data acquisition section 21, to thereby acquire a fluctuation speed after n hours from the regression model 31. Subsequently, the inference section 23 inputs, to the regression model 31, update data obtained by updating the input data with use of the acquired fluctuation speed after n hours, to thereby acquire fluctuation speed after 2n hours from the regression model 31. This process is iterated N times to acquire the fluctuation speed in a period up to N×n hours.

Then, the inference section 23 executes the above-described processing 2. Specifically, with regard to the input data and the simulation data, the inference section 23 performs inference with use of the regression model 31 through the above-described processing 1, to acquire a fluctuation speed in a period up to N×n hours for each data. This allows the inference section 23 to obtain M inference results on the changes over time in transmembrane pressure in a period up to N×n hours. The inference section 23 associates the input data and simulation data, based on which the inference has been performed, with each of the M inference results, to output the inference results to the service life determination section 24. Hereinafter, the combination of the inference result, and the input data or the simulation data may be referred to as "inference data".

The service life determination section 24 determines the service life of the separation membrane 93 on the M inference results inferred by the inference section 23, that is, the changes over time in M transmembrane pressures. Herein, the service life indicates a period of time until the transmembrane pressure of the separation membrane 93 reaches a predetermined upper limit, that is, a period of time before chemical washing of the separation membrane 93 is required. The upper limit is, but not limited to, for example, 12 kPa. As an example, the service life determination section 24 determines, as the service life of the separation membrane 93, a timing at which the transmembrane pressure reaches the upper limit, based on the changes over time in transmembrane pressure included in each piece of the inference data. The service life determination section 24 associates each of the determined service lives with the inference data based on which the determination has been performed, and outputs them to the cost calculation section 25.

The cost calculation section 25 calculates the operation cost required for the membrane filtration operation until the service life of the separation membrane 93 comes to an end. That is, the cost calculation section 25 calculates the operation cost on the basis of M pieces of the inference data.

Herein, the operation cost is a total cost obtained by adding the cost of energy required for air diffusion carried out by the air diffusion device 95 until the service life comes to an end, and a cost required for chemical washing of the separation membrane 93 the service life of which has ended. The cost required for chemical washing includes a purchase cost of a chemical or chemicals used for the chemical washing and a labor cost of an operator who performs the chemical washing.

The cost calculation section 25 calculates, with respect to each of the M pieces of the inference data, a diffused air volume per unit membrane filtration flow rate until the service life of the separation membrane 93 comes to an end. As an example, the cost calculation section 25 calculates a total value of the diffused air volume at a timing at which the service life of the separation membrane 93 comes to an end, based on the diffused air volume and the integrated diffused air volume, which are included in the input data or the simulation data included in each piece of the inference data, and the service life associated with each piece of the inference data. Subsequently, the cost calculation section 25 calculates a diffused air volume per unit membrane filtration flow rate by dividing each of the calculated total values by the total membrane filtration flow rate until the service life of the separation membrane 93 comes to an end. For example, the total membrane filtration flow rate may be calculated by determining in advance a membrane filtration flow rate per unit time, and by multiplying the determined membrane filtration flow rate by the period required until the service life of the separation membrane 93 comes to an end.

Subsequently, the cost calculation section 25 calculates power consumption per unit membrane filtration flow rate on the basis of the calculated diffused air volume per unit membrane filtration flow rate (hereinafter referred to simply as "diffused air volume"). As an example, the cost calculation section 25 calculates power consumption per unit membrane filtration flow rate by multiplying the calculated diffused air volume by power consumption per unit diffused air volume, which is a predetermined value.

Subsequently, the cost calculation section 25 calculates an electricity bill per unit membrane filtration flow rate on the basis of the calculated power consumption per membrane filtration flow rate (hereinafter referred to simply as "power consumption"). The obtained electricity bill is a cost of energy, which is mentioned above. As an example, the cost calculation section 25 calculates an electricity bill per unit membrane filtration flow rate by multiplying the calculated power consumption by the electricity bill per unit power consumption, which is a predetermined value.

Subsequently, the cost calculation section 25 calculates an operation cost by adding, to the calculated electricity bill per unit membrane filtration flow rate, a cost required for chemical washing per unit membrane filtration flow rate, which is a predetermined value. The cost calculation section 25 outputs the calculated operation cost to the inference result selection section 26, associating the operation cost with the service life and the inference data, base on which the operation cost has been calculated.

The inference result selection section 26 selects, from the M pieces of the acquired inference data, a piece of inference data that satisfies a predetermined condition. This condition includes at least one selected from the group consisting of a time period condition regarding the service life associated with the inference data and a cost condition regarding the operation cost; according to Embodiment 1, the following description will discuss an example in which the cost condition is employed. As an example, the cost condition is "the operation cost is minimum". The inference result selection section 26 outputs, to the output section 27, the diffused air volume of the input data or the simulation data included in the selected inference data, that is, the inference data in which the associated operation cost is minimum.

The output section 27 is a communication device that outputs (transmits), to the diffused air volume control device 8, the diffused air volume acquired from the inference result selection section 26.

(Diffused Air Volume Control Device 8)

The diffused air volume control device 8 includes a diffused air volume acquisition section 81 and a diffused air volume control section 82. The diffused air volume acquisition section 81 acquires the diffused air volume received from the inference device 2, and outputs the diffused air volume to the diffused air volume control section 82.

The diffused air volume control section 82 controls the air diffusion device 95 so that the air diffusion device 95 performs air diffusion on the basis of the acquired diffused air volume.

<Flow of Inference Process and Diffused Air Volume Control Process>

Figure 6:
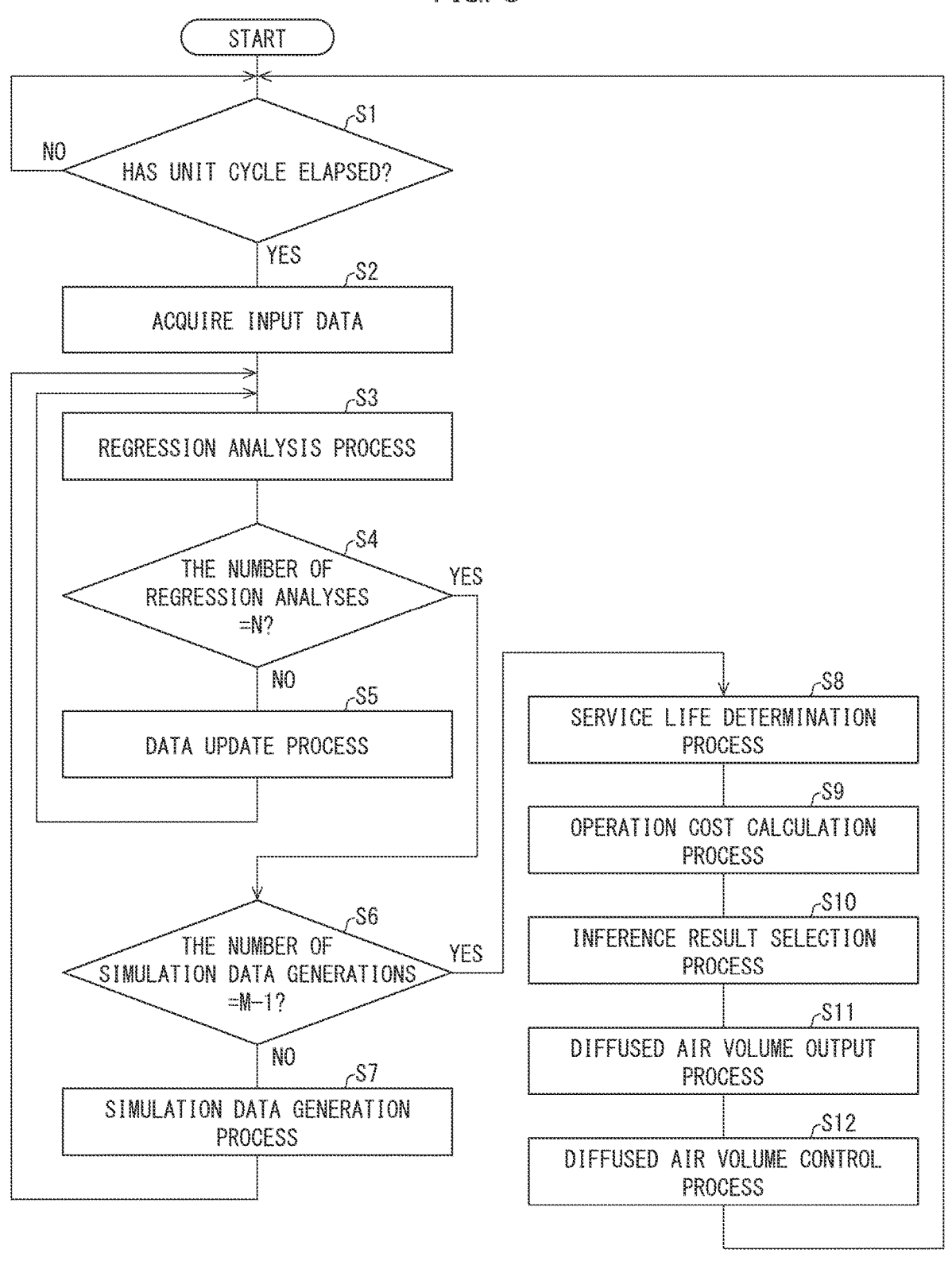
FIG. 6 is a flowchart illustrating an example of a flow of an inference process executed by the inference device illustrated in FIG. 5 and a diffused air volume control process executed by the diffused air volume control device illustrated in FIG. 5.

FIG. 6 is a flowchart illustrating an example of a flow of an inference process executed by the inference device 2 and a diffused air volume control process executed by the diffused air volume control device 8.

The input data acquisition section 21 is on standby until the unit cycle has elapsed (S1). When the unit cycle has elapsed (YES in S1), the input data acquisition section 21 acquires input data from the input data calculation device 5 (S2). The input data acquisition section 21 outputs the input data to the access section 22.

When the access section 22 acquires the input data, the access section 22 makes access to the regression model 31 stored in the storage device 3. Subsequently, the inference section 23 executes a regression analysis process (S3). Specifically, the inference section 23 inputs, to the regression model 31 to which the access section 22 has made access, the input data acquired by the input data acquisition section 21, to thereby acquire a fluctuation speed after n hours from the regression model 31.

Subsequently, the inference section 23 determines whether or not the number of regression analyses, which is the number of times the regression analysis process has been executed, has reached N times (S4). In a case where the number of regression analyses has not reached N times (NO in S4), the inference section 23 executes a data update process (S5). Specifically, the inference section 23 generates update data in which the fluctuation speed in the input data has been updated with use of the acquired fluctuation speed after n hours. Then, the inference section 23 executes the process in S3 again with use of the update data. Note that an object which will be subjected to the execution of the process in S3 for the subsequent times is update data having been generated in the most recent process in S5. That is, the inference section 23 inputs the generated update data to the regression model 31. The inference section 23 repeats the execution of the process in S5 and the subsequent process in S3 until it is determined in the process in S4 that the number of regression analyses has reached N times. When the number of regression analyses has reached N times, the inference section 23 acquires, with respect to the input data, the fluctuation speed in a period up to N×n hours during which the current value of the diffused air volume is maintained.

In a case where the number of regression analyses has reached N times (YES in S4), the inference section 23 determines whether or not the number of simulation data generations has reached M−1 times (S6). Note that since the number of simulation data generations is 0 times at the first move to S6, the inference section 23 determines that the number of simulation data generations has not reached M−1 times.

In a case where the number of simulation data generations has not reached M−1 times (NO in S6), the inference section 23 executes a simulation data generation process (S7). Specifically, the inference section 23 changes the diffused air volume in the input data to generate simulation data. Then, the inference section 23 executes the processes in S3 to S5 on the generated simulation data. As a result, the inference section 23 acquires, with respect to the generated simulation data, the fluctuation speed in a period up to N×n hours during which the current value of the diffused air volume is maintained. Further, the inference section 23 repeats the execution of the process in S7 and the subsequent processes in S3 to S5 until it is determined in the process in S6 that the number of simulation data generations has reached M−1 times. When the number of simulation data generations has reached M−1 times, the inference section 23 acquires M fluctuation speeds in a period up to N×n hours.

In a case where the number of simulation data generations has reached M−1 times (YES in S6), the inference section 23 generates changes over time in transmembrane pressure from each piece of the fluctuation speed in a period up to N×n hours. Then, the inference section 23 outputs, to the service life determination section 24, (A) the input data, (B) the changes over time in transmembrane pressure in a period up to N×n hours inferred on the basis of the input data, (C) the simulation data $S_2$ to $S_M$, and (D) the changes over time in transmembrane pressure in a period up to N×n hours inferred on the basis of each piece of the simulation data $S_2$ to $S_M$. The combination of (A) and (B), and the combination of (C) and (D) are the inference data mentioned above.

Subsequently, the service life determination section 24 executes a service life determination process (S8). Specifically, the service life determination section 24 determines the service life of the separation membrane 93 from the changes over time inferred on the basis of the input data acquired from the inference section 23 and from the changes over time inferred on the basis of the simulation data. The service life determination section 24 associates each of M determined service lives with the inference data including the changes over time based on which the determination has been performed, and outputs the associated service lives to the cost calculation section 25.

Subsequently, the cost calculation section 25 executes an operation cost calculation process (S9). Specifically, the cost calculation section 25 calculates an operation cost on the basis of the service life associated with each piece of the inference data and on the basis of the integrated diffused air volume included in the input data or the simulation data included in each piece of the inference data. The cost calculation section 25 associates each of the M calculated operation costs with (i) the inference data included in the input data or the simulation data, based on which the calculation has been performed, and (ii) the service life, and the cost calculation section 25 outputs the associated operation costs to the inference result selection section 26.

Subsequently, the inference result selection section 26 executes an inference result selection process (S10). Specifically, the inference result selection section 26 selects, from M pieces of the acquired inference data, inference data in which the associated operation cost is minimum. The inference result selection section 26 outputs, to the output section 27, a diffused air volume of the input data or the simulation data included in the selected inference data.

Subsequently, the output section 27 executes a diffused air volume output process (S11). Specifically, the output section 27 transmits the diffused air volume, selected by the inference result selection section 26, to the diffused air volume control device 8.

Subsequently, the diffused air volume control device 8 executes a diffused air volume control process (S12). Specifically, the diffused air volume control section 82 controls the air diffusion device 95 so that the air diffusion device 95 performs air diffusion at the diffused air volume received by the diffused air volume acquisition section 81. After step S12, that is, when the diffused air volume control process is terminated, the inference process returns to step S1.

Specific Example of Diffused Air Volume Control

Figure 7:
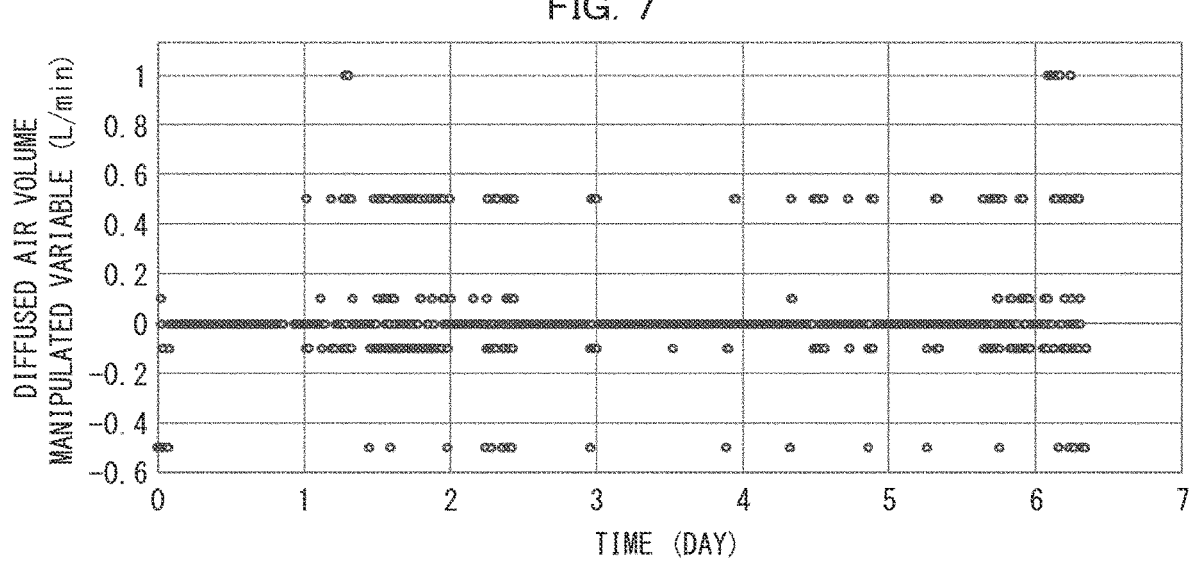
FIG. 7 is a diagram showing a specific example of the diffused air volume control process.

FIG. 7 is a diagram showing a specific example of the diffused air volume control process. Specifically, FIG. 7 is a graph showing the changes over time in manipulated variable of a diffused air volume with respect to the most recent diffused air volume. Herein, the manipulated variable is a difference between a diffused air volume in the most recent unit cycle and a diffused air volume in the current unit cycle. Specifically, the manipulated variable is obtained by subtracting a diffused air volume in the most recent cycle from a diffused air volume in the current unit cycle. Further, each of points depicted in the graph indicates the manipulated variable in a corresponding unit cycle.

In the example illustrated in FIG. 7, the manipulated variable is –0.5, –0.1, 0, 0.1, 0.5, and 1 (L/min). The negative values of the manipulated variable (–0.5 and –0.1) indicate that the diffused air volume is decreased from that in the most recent unit cycle. Further, the positive values of the manipulated variable (0.1, 0.5, and 1) indicate that the diffused air volume is increased from that in the most recent unit cycle. Note that the values of the manipulated variable are not limited to those in this example.

The manipulated variable being zero indicates that the diffused air volume is not changed compared to that in the most recent unit cycle, and that the inference result selection section 26 of the inference device 2 selects inference data that includes input data. Further, the manipulated variable being other than zero indicates that the inference result selection section 26 selects any piece of the inference data that includes the simulation data.

In this way, the diffused air volume control device 8 in accordance with Embodiment 1 performs the diffused air volume control on the basis of the diffused air volume selected by the inference device 2 for each unit cycle. This allows, in the membrane filtration process, the diffused air volume control to be performed in a manner such that the predetermined condition (in Embodiment 1, the condition in which the operation cost is minimum) is satisfied.

Effect

As described above, the inference device 2 in accordance with Embodiment 1 includes the input data acquisition section 21 configured to acquire input data, and the inference section 23 configured to execute the inference process of obtaining M inference results on changes over time in transmembrane pressure.

With this configuration, it is possible to perform a simulation that repeats long-term inference of transmembrane pressure based on the regression analysis while changing part of input data, to obtain M inference results. Since the input data used to obtain the respective M inference results partly differs, the inference results also differ from each other in change over time in transmembrane pressure. Thus, a user of the inference device 2 can select an appropriate inference result from the M inference results, to perform the membrane filtration operation on the basis of the inference result.

Further, since, in the inference process, input data having various patterns can be used in the simulation, it is possible to achieve an appropriate membrane filtration operation, considering an untypical situation that does not suit the typical approach of "when the condition of the separation membrane is worse, the diffused air volume is increased to reduce an increase in transmembrane pressure".

Further, the input data acquisition section 21 acquires input data every time the unit cycle has elapsed, and the inference section 23 executes the inference process every time the input data acquisition section 21 acquires the input data.

With this configuration, since the inference process is executed every time the unit cycle has elapsed, it is possible to obtain M inference results for each unit cycle. This allows a user of the inference device 2 to select the most suitable inference result for each unit cycle, resulting in a long-term continuation of the appropriate membrane filtration operation.

Further, the inference device 2 further includes the service life determination section 24 configured to determine the service life of the separation membrane 93 for each of the changes over time inferred by the inference section 23.

With this configuration, it is possible to determine the service life of the separation membrane 93 for each of M inference results. This allows a user of the inference device 2 to select, from the M inference results, an inference result that optimizes the service life of the separation membrane 93, so as to perform the membrane filtration operation on the basis of the inference result.

Further, the inference device 2 further includes the cost calculation section 25 configured to calculate an operation cost required for the membrane filtration operation until the service life of the separation membrane 93 comes to an end.

With this configuration, it is possible to calculate the operation cost to be required before the chemical washing for each of M inference results is required. This allows a user of the inference device 2 to select, from the M inference results, an inference result that optimizes the operation cost, so as to perform the membrane filtration operation on the basis of the inference result.

Further, the inference device 2 further includes the inference result selection section 26 configured to select, from the M inference results, an inference result in which the operation cost calculated by the cost calculation section 25 satisfies the predetermined cost condition.

With this configuration, since the inference result that satisfies the predetermined cost condition is selected from the M inference results, it is possible to save in user's effort to select an appropriate inference result.

Further, the cost calculation section 25 calculates, as an operation cost, a total of a cost of energy required for air diffusion performed by the air diffusion device 95 until the service life of the separation membrane 93 comes to an end, and a cost required for the chemical washing of the separation membrane 93.

With this configuration, it is possible to calculate the operation cost, considering the cost of energy and the cost required for the chemical washing.

Further, the diffused air volume control device 8 in accordance with Embodiment 1 includes: the diffused air volume acquisition section 81 configured to receive diffused air included in the input data or the simulation data, based on which the inference result selected by the inference device 2 is inferred; and the diffused air volume control section 82 configured to control the air diffusion device 95 so that the air diffusion device 95 performs air diffusion on the basis of the diffused air volume.

With this configuration, it is possible to control the diffused air volume of the air diffusion device 95 on the basis of the inference result of the inference device 2. Further, since the diffused air volume is based on a diffused air volume included in the input data or the simulation data used to infer the inference result that satisfies the condition, it is possible to perform the air diffusion at the diffused air volume desired by a user.

The condition for use in selection of the inference data by the inference result selection section 26 may be the time period condition only. The time period condition may be, for example, "the longest service life of the separation membrane 93". That is, in this example, the inference result selection section 26 selects, from the M pieces of the inference data, a piece of the inference data in which the separation membrane 93 has the longest service life.

With this configuration, among the M inference results, the inference result that satisfies the predetermined time period condition is determined, so that it is possible to save user's effort to select an appropriate inference result. Note that, in this example, the control section 20 may include no cost calculation section 25.

Further, the condition for use in selection of the inference data by the inference result selection section 26 may be both the time period condition and the cost condition. In this example, the inference result selection section 26 selects, from the M pieces of the acquired inference data, a piece of the inference data in which the associated service life satisfies the predetermined time period condition and the associated operation cost satisfies the predetermined cost condition. As an example, the time period condition may be "the service life is within a predetermined numerical range", and the cost condition may be "the operation cost is within a predetermined numerical range". These numerical ranges may be set, by a user of the inference device 2, to any desired numerical ranges.

In this example, when there are multiple pieces of inference data associated with the service life satisfying the time period condition and the operation cost satisfying the cost condition, the inference result selection section 26 selects any one of the multiple pieces of the inference data. As an example, the inference result selection section 26 selects a piece of the inference data in which a total of an error between the predetermined target number of days and the service life, and an error between a predetermined target value and the operation cost is minimum.

With this configuration, among the M inference results, the inference result that satisfies the predetermined time period and cost conditions is determined, so that it is possible to save user's effort to select an appropriate inference result.

In the inference device 2, the service life determination section 24, the cost calculation section 25, and the inference result selection section 26 may be eliminated. Instead of these components, the inference device 2 may include a display device (not illustrated) that displays M pieces of the inference data. Such a display device may be integrated with the inference device 2, or alternatively, may be separated from the inference device 2.

In this example, a user of the inference device 2 selects a piece of the inference data from M pieces of the inference data. The output section 27 transmits, to the diffused air volume control device 8, the diffused air volume of the input data or the simulation data included in the piece of the inference data selected by the user.

Further, in the inference device 2, the output section 27 may be eliminated, besides the service life determination section 24, the cost calculation section 25, and the inference result selection section 26. In this example, a user of the inference device 2 input, to the diffused air volume control device 8, the diffused air volume of the input data or the simulation data included in the selected piece of the inference data.

Further, the operation cost calculated by the cost calculation section 25 is not limited to those illustrated above. For example, the operation cost may be an energy cost itself.

Further, the input data and the simulation data may include the manipulated variable of the diffused air volume, instead of or in addition to the diffused air volume. In an example in which the manipulated variable is included instead of the diffused air volume, the manipulated variable serves as data to be changed in the simulation data generation process. In an example in which the manipulated variable is included in addition to the diffused air volume, the diffused air volume and the manipulated variable serve as data to be changed in the simulation data generation process.

In an example in which the input data and the simulation data include the manipulated variable of the diffused air volume, the manipulated variable in the input data is zero. In addition, the manipulated variable in the simulation data has a value other than zero. In the example of FIG. 7, that is, in the example in which M=6, the manipulated variables in each piece of the simulation data are −0.5, −0.1, 0.1, 0.5, and 1.

Further, a numerical range for the diffused air volume may be set in advance. In other words, the diffused air volume control device 8 may control the diffused air volume in a manner such that the diffused air volume falls within the numerical range. In this example, when the diffused air volume received by the diffused air volume control device 8 is greater than the upper limit of the numerical range or is less than the lower limit, the diffused air volume control device 8 may maintain the current diffused air volume (i.e., the upper limit or the lower limit of the numerical range).

<Additional Remarks>

A transmembrane pressure inference device in accordance with an aspect of the present invention includes: an input data acquisition section configured to acquire input data derived from operation data that is measured during a membrane filtration operation which is carried out by a membrane separation device, the operation data including a membrane filtration pressure and a diffused air volume, the membrane separation device comprising: a separation membrane disposed so as to be immersed in a water to be treated; and an air diffusion device configured to perform air diffusion through a membrane surface of the separation membrane, the membrane separation device being configured to obtain a treated water that has passed through the separation membrane while causing the air diffusion device to perform the air diffusion; and an inference section configured to (i) use a regression model that uses, as an explanatory variable, the input data and uses, as an objective variable, transmembrane pressure-related data related to a transmembrane pressure of the separation membrane after a predetermined time associated with the input data, to infer the transmembrane pressure-related data after the predetermined time, and (ii) execute an updating process M times (where M is an integer of not less than 2) while changing part of data included in the input data, the updating process being a process of updating the input data N times (where N is an integer of not less than 2) by changing the transmembrane pressure-related data included in the input data to the inferred transmembrane pressure-related data, so as to execute an inference process of obtaining M inference results on changes over time in the transmembrane pressure in a period up to N×the predetermined time.

With this configuration, it is possible to perform a simulation that repeats long-term inference of transmembrane pressure based on the regression analysis while changing part of the input data, to obtain M inference results. Since the input data used to obtain the respective M inference results partly differs, the inference results also differ from each other in change over time in transmembrane pressure. Thus, a user of the transmembrane pressure inference device can select an appropriate inference result from the M inference results, to perform the membrane filtration operation on the basis of the inference result.

Further, in the above-described inference process, input data having various patterns can be used in the simulation, so that it is possible to achieve an appropriate membrane filtration operation, considering an untypical situation that does not suit the typical approach of "when the condition of the separation membrane is worse, the diffused air volume is increased to reduce an increase in transmembrane pressure".

A transmembrane pressure inference device in accordance with an aspect of the present invention may be such that: the membrane filtration operation is an intermittent operation; the input data is derived from the operation data in a unit period consisting of an operation period and a pause period that follows the operation period; the input data acquisition section acquires the input data in a cycle that is L times (where L is an integer of not less than 1) as long as the unit period; and the inference section executes the inference process every time the input data acquisition section acquires the input data.

With this configuration, since the inference process is executed in the cycle that is L times as long as the unit period, it is possible to obtain M inference results for each cycle. This allows a user of the transmembrane pressure inference device to select the most suitable inference result for each cycle, resulting in a long-term continuation of the appropriate membrane filtration operation.

A transmembrane pressure inference device in accordance with an aspect of the present invention may further include a period determination section configured to determine a period of time until a transmembrane pressure reaches a predetermined upper limit for each of the changes over time inferred by the inference section.

With this configuration, it is possible to determine a period of time before chemical washing of the separation membrane is required (i.e., the service life of the separation membrane), for each of the M inference results. This allows a user of the transmembrane pressure inference device to select, from the M inference results, an inference result that optimizes the service life of the separation membrane, so as to perform the membrane filtration operation on the basis of the inference result.

A transmembrane pressure inference device in accordance with an aspect of the present invention may further include a cost calculation section configured to calculate an operation cost required for the membrane filtration operation until the determined period of time comes to an end.

With this configuration, it is possible to calculate the operation cost to be required before the chemical washing is required for each of M inference results. This allows a user of the transmembrane pressure inference device to select, from the M inference results, an inference result that optimizes the operation cost, so as to perform the membrane filtration operation on the basis of the inference result.

A transmembrane pressure inference device in accordance with an aspect of the present invention may further include a determination section configured to determine, among the M inference results, an inference result in which the period of time determined by the period determination section satisfies a predetermined time period condition.

With this configuration, among the M inference results, the inference result that satisfies the predetermined time period condition is determined, so that it is possible to save user's effort to select an appropriate inference result.

A transmembrane pressure inference device in accordance with an aspect of the present invention may further include a determination section configured to determine, among the M inference results, an inference result in which the operation cost calculated by the cost calculation section satisfies a predetermined cost condition.

With this configuration, among the M inference results, the inference result that satisfies the predetermined cost condition is determined, so that it is possible to save user's effort to select an appropriate inference result.

A transmembrane pressure inference device in accordance with an aspect of the present invention may further include a determination section configured to determine, among the M inference results, an inference result in which the period of time determined by the period determination section satisfies a predetermined time period condition and the operation cost calculated by the cost calculation section satisfies a predetermined cost condition.

With this configuration, among the M inference results, the inference result that satisfies the predetermined temporal and cost conditions is determined, so that it is possible to save user's effort to select an appropriate inference result.

A transmembrane pressure inference device in accordance with an aspect of the present invention may be such that the cost calculation section calculates, as the operation cost, a total of a cost of energy required for air diffusion performed by the air diffusion device until the determined period of time comes to an end, and a cost required for chemical washing of the separation membrane.

With this configuration, it is possible to calculate the operation cost, considering the cost of energy and the cost required for the chemical washing.

A diffused air volume control device in accordance with an aspect of the present invention includes a diffused air volume acquisition section configured to acquire diffused air volume-related data included in the input data used in inference of an inference result determined by the transmembrane pressure inference device, the diffused air volume-related data being related to a diffused air volume of the air diffusion device, the diffused air volume control device being configured to control the air diffusion device so that the air diffusion device performs air diffusion on the basis of the acquired diffused air volume-related data.

With this configuration, it is possible to control the diffused air volume of the air diffusion device on the basis of the inference result of the transmembrane pressure inference device. Further, since the diffused air volume is based on the diffused air volume-related data included in the input data used in inference of the inference result that satisfies the condition, it is possible to perform the air diffusion at the diffused air volume desired by a user.

Software Implementation Example

Control blocks of the regression model generation device 1, the inference device 2, and the diffused air volume control device 8 (particularly, the control sections 10 and 20, and the diffused air volume control section 82) can be realized by a logic circuit (hardware) provided in an integrated circuit (IC chip) or the like or can be alternatively realized by software.

In the latter case, the regression model generation device 1, the inference device 2, and the diffused air volume control device 8 include a computer that executes instructions of a program that is software realizing the foregoing functions. The computer includes, for example, at least one processor and a computer-readable storage medium storing the program. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

2 Inference device (transmembrane pressure inference device)
8 Diffused air volume control device
21 Input data acquisition section
23 Inference section
24 Service life determination section (period determination section)
25 Cost calculation section
26 Inference result selection section (determination section)
31 Regression model
90 Membrane separation device
92 Water to be treated
93 Separation membrane
95 Air diffusion device

The invention claimed is:

1. A transmembrane pressure inference device comprising: an input data acquisition section configured to acquire input data derived from operation data that is measured during a membrane filtration operation which is carried out by a membrane separation device, the operation data including a membrane filtration pressure and a diffused air volume, the membrane separation device comprising: a separation membrane disposed so as to be immersed in water to be treated; and an air diffusion device configured to perform air diffusion through a membrane surface of the separation membrane, the membrane separation device being configured to obtain treated water that has passed through the separation membrane while causing the air diffusion device to perform the air diffusion; and an inference section configured to:
(i) use a regression model that uses, as an explanatory variable, the input data and uses, as an objective variable, transmembrane pressure-related data related to a transmembrane pressure of the separation membrane after a predetermined time associated with the input data, to infer the transmembrane pressure-related data after the predetermined time, and
(ii) execute an updating process M times (where M is an integer of not less than 2) while changing a part of the input data, the updating process being a process of updating the input data N times (where N is an integer of not less than 2) by changing the transmembrane pressure-related data included in the input data to the inferred transmembrane pressure-related data, so as to execute an inference process of obtaining M inference results on changes over time in the transmembrane pressure in a period up to Nx the predetermined time.

2. The transmembrane pressure inference device according to claim 1, wherein:
the membrane filtration operation is an intermittent operation;
the input data is derived from the operation data in a unit period consisting of an operation period and a pause period that follows the operation period;
the input data acquisition section acquires the input data in a cycle that is L times (where L is an integer of not less than 1) as long as the unit period; and
the inference section executes the inference process every time the input data acquisition section acquires the input data.

3. The transmembrane pressure inference device according to claim 1, further comprising a period determination section configured to determine a period of time until a transmembrane pressure reaches a predetermined upper limit for each of the changes over time inferred by the inference section.

4. The transmembrane pressure inference device according to claim 3, further comprising a cost calculation section configured to calculate an operation cost required for the membrane filtration operation until the determined period of time comes to an end.

5. The transmembrane pressure inference device according to claim 4, further comprising a determination section configured to determine, among the M inference results, an inference result in which the operation cost calculated by the cost calculation section satisfies a predetermined cost condition.

6. The transmembrane pressure inference device according to claim 4, further comprising a determination section configured to determine, among the M inference results, an inference result in which the period of time determined by the period determination section satisfies a predetermined time period condition and the operation cost calculated by the cost calculation section satisfies a predetermined cost condition.

7. The transmembrane pressure inference device according to claim 4, wherein the cost calculation section calculates, as the operation cost, a total of a cost of energy required for air diffusion performed by the air diffusion device until the determined period of time comes to an end, and a cost required for chemical washing of the separation membrane.

8. The transmembrane pressure inference device according to claim 3, further comprising a determination section configured to determine, among the M inference results, an inference result in which the period of time determined by the period determination section satisfies a predetermined time period condition.

9. A diffused air volume control device comprising a diffused air volume acquisition section configured to acquire diffused air volume-related data included in the input data used in inference of an inference result determined by the transmembrane pressure inference device according to claim 8, the diffused air volume-related data being related to a diffused air volume of the air diffusion device, the diffused air volume control device being configured to control the air diffusion device so that the air diffusion device performs air diffusion on the basis of the acquired diffused air volume-related data.

* * * * *